US012632334B2

(12) United States Patent
Chen et al.

(10) Patent No.: US 12,632,334 B2
(45) Date of Patent: May 19, 2026

(54) DATA TRANSMISSION SYSTEM, VERIFICATION METHOD AND SLAVE DEVICE

(71) Applicant: Realtek Semiconductor Corporation, Hsinchu (TW)

(72) Inventors: Penao Chen, Hsinchu (TW); Kuochou Cheng, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 21 days.

(21) Appl. No.: 18/772,297

(22) Filed: Jul. 15, 2024

(65) Prior Publication Data

US 2025/0103427 A1     Mar. 27, 2025

(30) Foreign Application Priority Data

Sep. 22, 2023    (TW) ................................. 112136386

(51) Int. Cl.
G06F 11/10          (2006.01)
(52) U.S. Cl.
CPC ...... G06F 11/1048 (2013.01); G06F 11/1016 (2013.01)
(58) Field of Classification Search
CPC .......................... G06F 11/1048; G06F 11/1016
USPC ......................................................... 714/758
See application file for complete search history.

(56) References Cited

U.S. PATENT DOCUMENTS

| | | | | |
|---|---|---|---|---|
| 11,764,807 B2 * | 9/2023 | Sharma | ............... | G06F 11/1048 |
| | | | | 714/763 |
| 2001/0037491 A1 * | 11/2001 | Boggs | ................. | G06F 11/3636 |
| | | | | 715/744 |
| 2014/0258793 A1 * | 9/2014 | Guo | ..................... | G06F 11/2205 |
| | | | | 714/57 |
| 2020/0159615 A1 * | 5/2020 | Wu | ...................... | G06F 13/4282 |

FOREIGN PATENT DOCUMENTS

| | | | | | |
|---|---|---|---|---|---|
| CN | 101777030 A | * | 7/2010 | | |
| CN | 114168503 B | * | 1/2025 | ............ | H04L 69/08 |
| TW | 202203048 A | | 1/2022 | | |

* cited by examiner

*Primary Examiner* — Esaw T Abraham
*Assistant Examiner* — Enam Ahmed
(74) *Attorney, Agent, or Firm* — CKC & Partners Co., LLC

(57)          ABSTRACT

A data transmission system includes a master device and a slave device. The master device is configured to output a write instruction. The write instruction includes a control data. The slave device includes a data register coupled to the master device. In response to that the slave device receives the write instruction, the slave device is configured to perform a write operation to store the control data at an address in the data register according to the write instruction. The slave device is configured to generate a verification data corresponding to the write operation according to the control data and the address. The master device is configured to utilize the verification data to verify the write operation.

18 Claims, 5 Drawing Sheets

| PRE | ST | OP | PRTAD | DEVAD | TA | REG_DATA |
|-----|-----|-----|-----|-----|-----|-----|

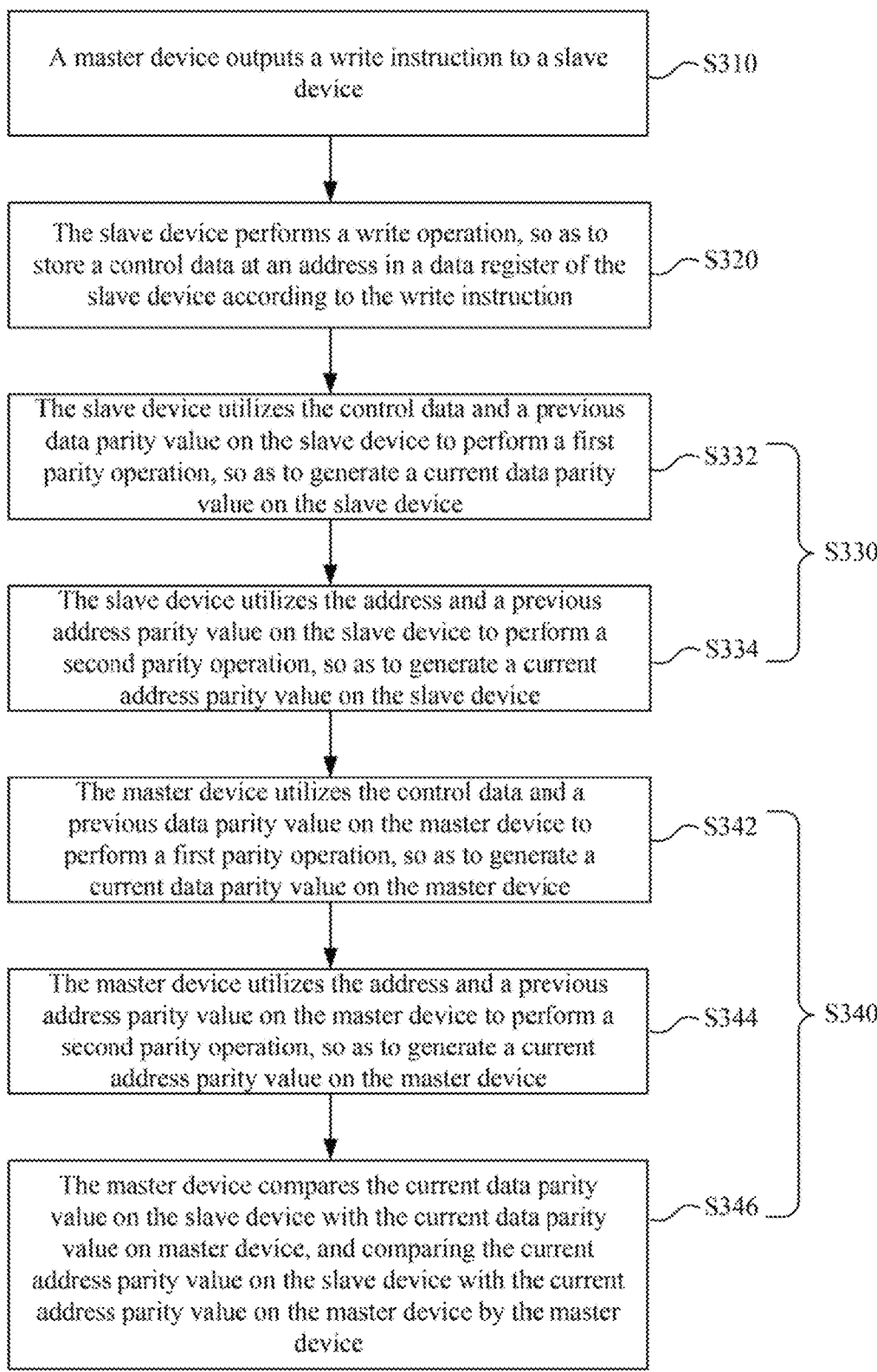

A master device outputs a write instruction to a slave device —— S310

The slave device performs a write operation, so as to store a control data at an address in a data register of the slave device according to the write instruction —— S320

The slave device utilizes the control data and a previous data parity value on the slave device to perform a first parity operation, so as to generate a current data parity value on the slave device —— S332

The slave device utilizes the address and a previous address parity value on the slave device to perform a second parity operation, so as to generate a current address parity value on the slave device —— S334

} S330

The master device utilizes the control data and a previous data parity value on the master device to perform a first parity operation, so as to generate a current data parity value on the master device —— S342

The master device utilizes the address and a previous address parity value on the master device to perform a second parity operation, so as to generate a current address parity value on the master device —— S344

The master device compares the current data parity value on the slave device with the current data parity value on master device, and comparing the current address parity value on the slave device with the current address parity value on the master device by the master device —— S346

DATA TRANSMISSION SYSTEM, VERIFICATION METHOD AND SLAVE DEVICE

RELATED APPLICATIONS

This application claims priority to Taiwan Application Serial Number 112136386, filed on Sep. 22, 2023, which is herein incorporated by reference in its entirety.

BACKGROUND

Technical Field

The present disclosure relates to a data transmission technique. More particularly, the present disclosure relates to a data transmission system and a verification method capable of verifying write operations.

Description of Related Art

In communication protocols with master-slave relationships such as media-independent interface, serial peripheral interface or inter-integrated circuit bus, a master device will perform read operations and write operations on registers of a slave device so as to control the behavior of the slave device. However, the traditional circuit design does not provide a checking mechanism to verify whether the registers of the slave device have been set correctly, causing the slave device to be prone to unexpected operation errors.

SUMMARY

The present disclosure provides a data transmission system, comprising a master device and a slave device. The master device is configured to output a write instruction, wherein the write instruction comprises a control data. The slave device comprises a data register, coupled to the master device, wherein when the slave device receives the write instruction, the slave device is configured to perform a write operation to store the control data in an address of the data register according to the write instruction. The slave device is configured to generate a verification data corresponding to the write operation according to the control data and the address. The master device is configured to utilize the verification data to verify the write operation.

The present disclosure provides a verification method, comprising: outputting a write instruction from a master device to a slave device, wherein the write instruction comprises a control data; performing a write operation by the slave device, so as to store the control data to an address of a data register of the slave device according to the write instruction; generating a verification data corresponding to the write operation by the slave device according to the control data and the address; and utilizing the verification data to verify the write operation by the master device.

The present disclosure provides a slave device, configured to receive a write instruction outputted by a master device, wherein the write instruction comprises a control data, the slave device comprises a data register, a processor and a parity checker. The processor is configured to perform a write operation, so as to store the control data in an address of the data register according to the write instruction. The parity checker is configured to utilize the control data and a previous data parity value on the slave device to perform a first parity operation, so as to generate a current data parity value on the slave device, and configured to utilize the address and a previous address parity value on the slave device to perform a second parity operation, so as to generate a current address parity value on the slave device. The processor is configured to output the current data parity value on the slave device and the current address parity value on the slave device to the master device. The first parity operation is the same as or different from the second parity operation.

BRIEF DESCRIPTION OF THE DRAWINGS

FIG. 2 is a schematic diagram of a frame format according to one embodiment of the present disclosure.

FIG. 3 is a flowchart of a verification method according to one embodiment of the present disclosure.

DETAILED DESCRIPTION

Figure 1:
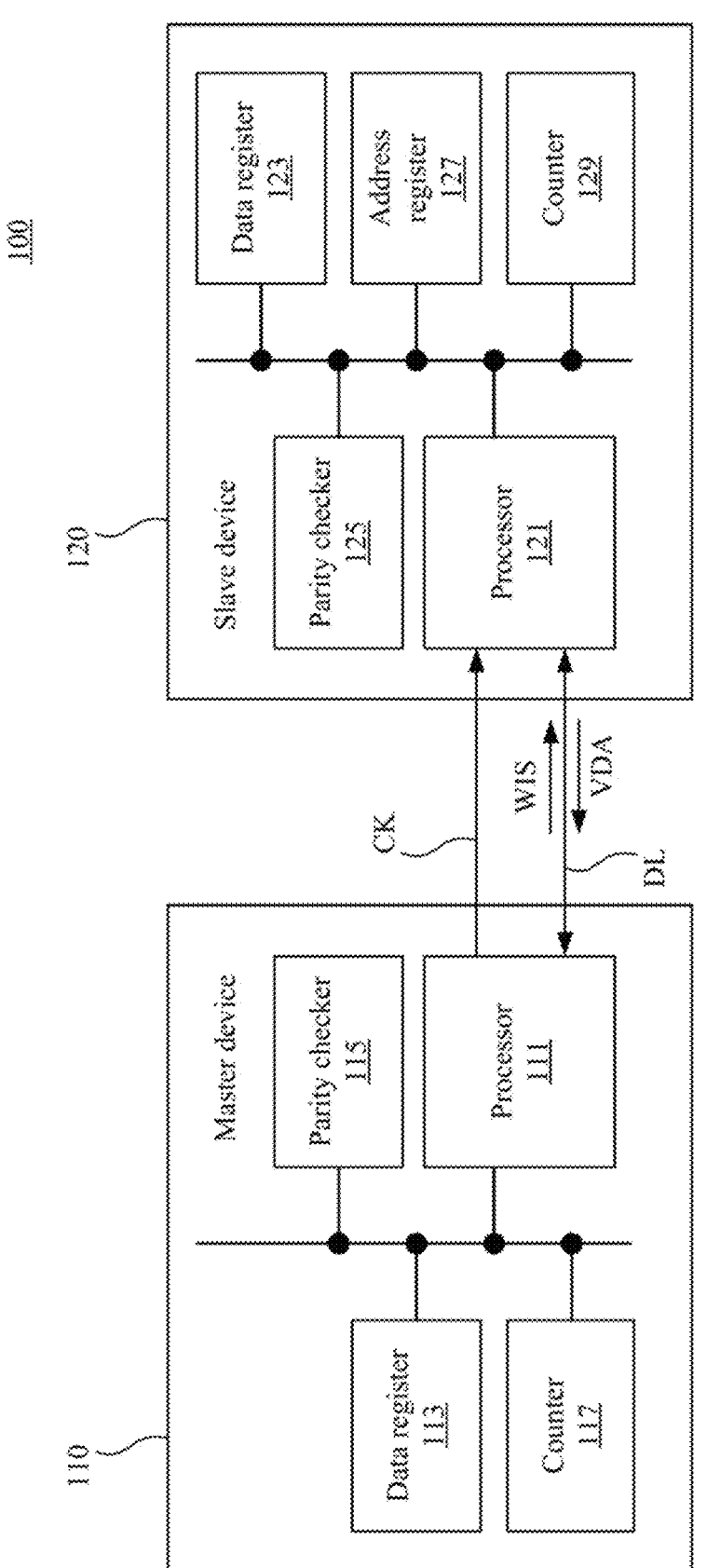
FIG. 1 is a simplified functional block diagram of a data transmission system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a data transmission system 100 according to one embodiment of the present disclosure. The data transmission system 100 comprises a master device 110 and a slave device 120 coupled to each other. The master device 110 reads or writes the slave device 120 through a data line DL, and thereby controls the slave device 120. The master device 110 is further configured to provide a clock signal to the slave device 120 through a clock line CK, so as to synchronize the data transmission between the master device 110 and the slave device 120. In some embodiments, the master device 110 and the slave device 120 are media access control (MAC) device and a physical layer (PHY) device, respectively, and the data line DL and the clock line CK are an MDIO signal line and an MDC signal line in a media-independent interface, respectively.

However, the present disclosure is not limiter thereto. The master device 110 and the slave device 120 may be any suitable electronic device capable of communicating through a communication protocol with a master-slave relationship. In some embodiments, the data DL comprises an MOSI signal line and an MISO signal line in a serial peripheral interface, while the clock line CK being an SCK signal line in the serial peripheral interface. In other embodiments, the data line DL and the clock line CK are a SDA signal line and an SCL signal line in an inter-integrated circuit bus, respectively.

Figure 2:
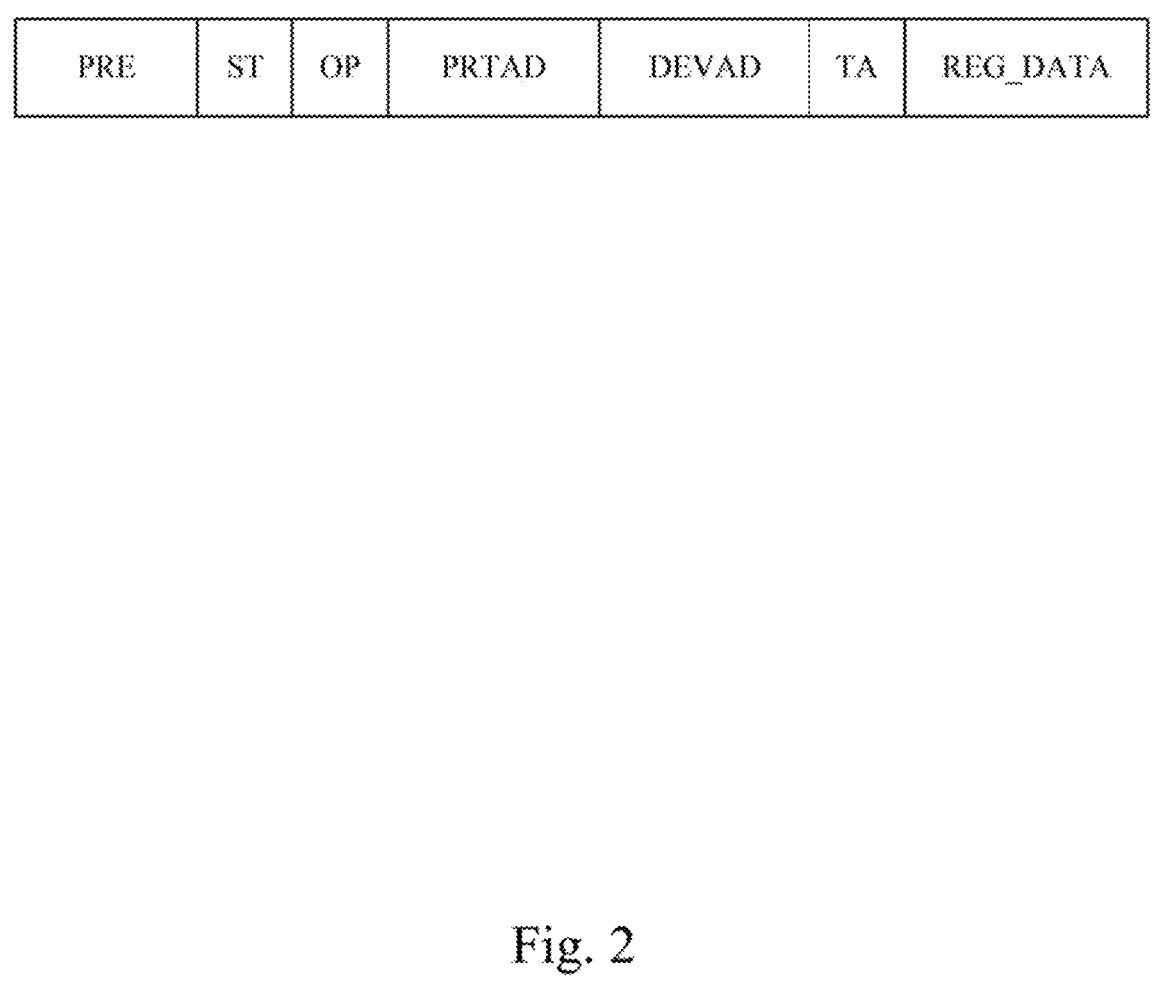

Refer to FIG. 2 together, wherein FIG. 2 is a schematic diagram of a Clause 45 MDIO frame format according to one embodiment of the present disclosure. The Clause 45 MDIO frame format comprises a preamble field PRE, a start of frame field ST, an operation code field OP, a port address field PRTAD, a device address field DEVAD, a turnaround time field TA and an address/data field REG_DATA. People having ordinary skill in the art may understand the meaning of each field in the Clause 45 MDIO frame format, for simplicity, related descriptions are omitted thereto.

The master device 110 comprises a processor 111, a data register 113, a parity checker 115 and a counter 117 coupled to each other. The master device 110 is configured to output a write instruction WIS to the slave device 120 through the data line DL. The write instruction WIS has a frame format of the Clause 45 MDIO frame format, and the address/data field REG_DATA of the write instruction WIS comprises a control data CDA or an address RAD (depicted in FIG. 4), but the present disclosure is not limited thereto. In other embodiments, the write instruction WIS may have any frame formats that comply with the communication protocol that the master device 110 and the slave device 120 are using.

The slave device 120 comprises a processor 121, a data register 123, a parity checker 125, an address register 127 and a counter 129 coupled to each other. The processors 111 and 121 are coupled to each other through the data line DL and the clock line CK. As the processor 121 of the slave device 120 receives the write instruction WIS from the processor 111 of the master device 110, the slave device 120 is configured to perform a write operation, so as to store the control data CDA in the address RAD of the data register 123 according to the write instruction WIS. The control data CDA is configured to control the behavior of the slave device 120. The slave device 120 is configured to utilize the content of the device address DEVAD of the write instruction WIS, so as to search a corresponding address RAD, wherein the detailed descriptions are provided in the following paragraphs with refer to the FIG. 3. The slave device 120 is further configured to generate a verification data VDA corresponding to the write operation according to the control data CDA and the address RAD, and configured to transmit the verification data VDA to the master device 110. The master device 110 is configured to utilize the verification data VDA to verify whether the write operation has been performed correctly, that is, whether the control data CDA has been written to the data register 123 correctly, or whether there is a variation in the content of the control data CDA or not.

FIG. 3 is a flowchart of a verification method 300 according to one embodiment of the present disclosure. The data transmission system 100 is configured to perform the verification method 300 to verify whether the write operation has been performed correctly or not. If the master device 110 does not output the write instruction WIS to slave device 120, or the slave device 120 determines that the instruction is not the write instruction WIS, then the data transmission system 100 may not perform the verification method 300. It will be understood the verification method 300 may include greater or fewer operations than illustrated in FIG. 3 and the operations may be performed in any order, as appropriate.

In step S310, the processor 111 of the master device 110 outputs the write instruction WIS to the slave device 120. As aforementioned, the write instruction WIS comprises the control data CDA.

In step S320, as the processor 121 of the slave device 120 determines that the received instruction is the write instruction WIS, the processor 121 performs a write operation to store the control data CDA in the address RAD of the data register 123 according to the write instruction WIS. The processor 121 is configured to determine a type of the received instruction according to the start of frame field ST and the operation code field OP in FIG. 2. The correspondence relationship is shown in the following Table 1.

4

TABLE 1

| Type of instruction | ST | OP |
|---|---|---|
| Address | 00 | 00 |
| Write | 00 | 01 |
| Read | 00 | 11 |
| Address (post-read-increment-address) | 00 | 10 |

It is worth mentioning that the master device 110 may output an "address instruction" to the slave device 120 before outputting a read instruction or the write instruction WIS. The address/data field REG_DATA of the "address instruction" comprises an address RAD. As the processor 121 determines that the received instruction is the "address instruction" according to the start of frame field ST and the operation code field OP, the processor 121 stores the address RAD in the address/data field REG_DATA in the address register 127. More specifically, each of the plurality of address in the address register 127 corresponds to each of a plurality of device types, respectively. The processor 121 may store the address RAD recorded in the address/data field REG_DATA of the "address instruction" in the corresponding one of the plurality of the address in the address register 127 according to the device type recorded in the device address field DEVAD of the "address instruction".

Then, as the processor 121 receives the read instruction or the write instruction WIS, the processor 121 utilizes the device type recorded in the device address field DEVAD of the write instruction WIS to search for the address register 127, so as to get the address RAD previously specified by the "address instruction", and further utilize the address RAD to perform read or write operations on the data register 123. In other words, the processor 121 searches for the corresponding address RAD from the address register 127 according to the read instruction or the write instruction WIS.

In addition, the master device 110 may transmit the "address instruction" to the slave device 120 for only once, and then transmit "post-read-increment-address instructions" continuously in the subsequent operations without transmitting the "address instruction" again. After the slave device 120 receives the "post-read-increment-address instruction", the slave device will start read operations on adjacent addresses automatically.

Figure 4:
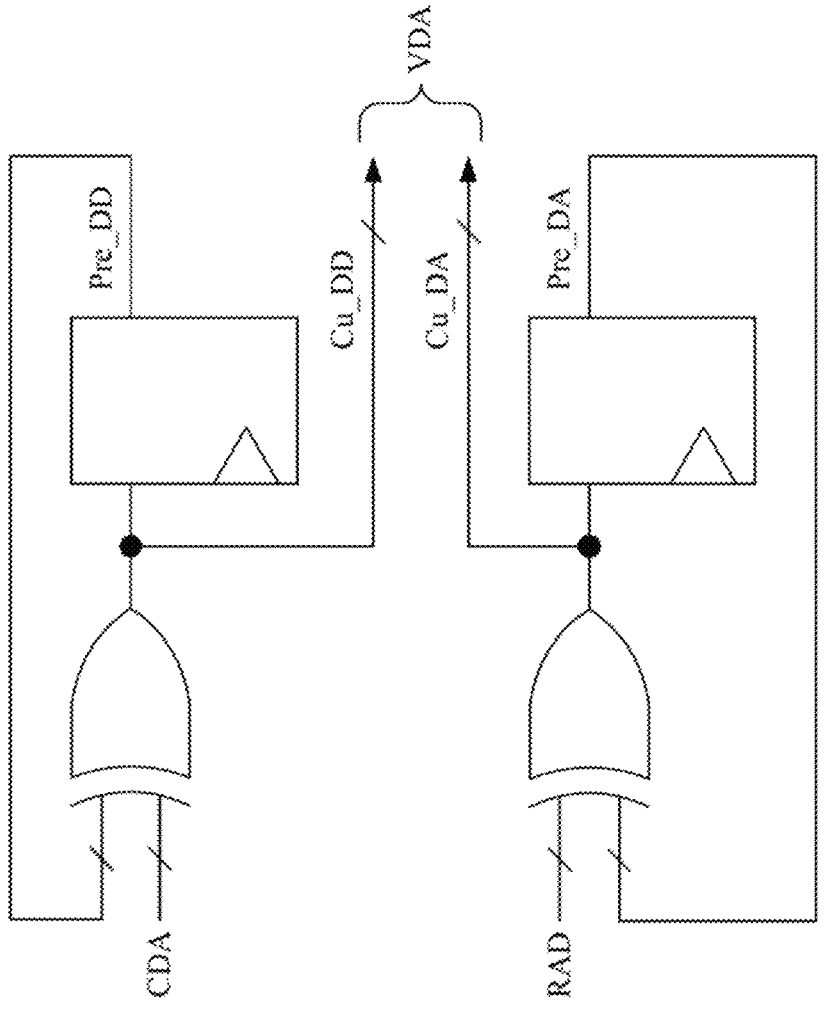
FIG. 4 is a simplified functional block diagram of a parity checker according to one embodiment of the present disclosure.

Refer to FIG. 4 together, wherein FIG. 4 is a simplified functional block diagram of a parity checker 125 according to one embodiment of the present disclosure. In step S330, as the processor 121 perform the write operation, the parity checker 125 may generate verification data VDA corresponding to the write operation according to the control data CDA and the address RAD, and the processor 121 is configured to transmit the verification data VDA to the master device 110.

More specifically, step S330 comprises step S332 and step S334. In step S332, the parity checker 125 is configured to utilize the control data CDA and a previous data parity value Pre_DD on the slave device to perform a first parity operation (e.g., an XOR operation), so as to generate a current data parity value Cu_DD on the slave device. The parity checker 125 is further configured to utilize the current data parity value Cu_DD on the slave device to update the previous data parity value Pre_DD on the slave device. That is, the parity checker 125 will use the data parity value Cu_DD on the slave device as the previous data parity value Pre_DD on the slave device in the next first parity operation.

In step S334, the parity checker 125 is configured to utilize the device type recorded in the device address field DEVAD in the instruction WIS to search for the address register 127, so as to get the address RAD specified by the "address instruction" previously. The parity checker 125 is configured to utilize the address RAD and an address parity value Pre_DA on the slave device to perform a second parity operation (e.g., an XOR operation), so as to generate a current address parity value Cu_DA on the slave device. The parity checker 125 is further configured to utilize the address parity value Cu_DA to update the address parity value Pre_DA on the slave device. The is, the parity checker 125 will use the current address parity value Cu_DA on the slave device as the previous address parity value Pre_DA on the slave device in the next second parity operation.

The first parity operation and the second parity operation may or may not be the same. In some embodiments, at least one of the first parity operation and the second parity operation may be a checksum operation.

The verification data VDA comprises the current data parity value Cu_DD on the slave device and the current address parity value Cu_DA on the slave device. That is, the processor 121 is configured to output the current data parity value Cu_DD on the slave device and the current address parity value Cu_DA to the master device 110. In some embodiments, the counter 129 of the slave device 120 is configured to calculate an execution counting of the write operation (or a number of times the processor 121 receives the write instruction WIS), and the verification data VDA further comprises the execution counting of the write operation. In other words, the processor 121 is further configured to output the execution counting of the write operation to the master device 110.

Figure 5:
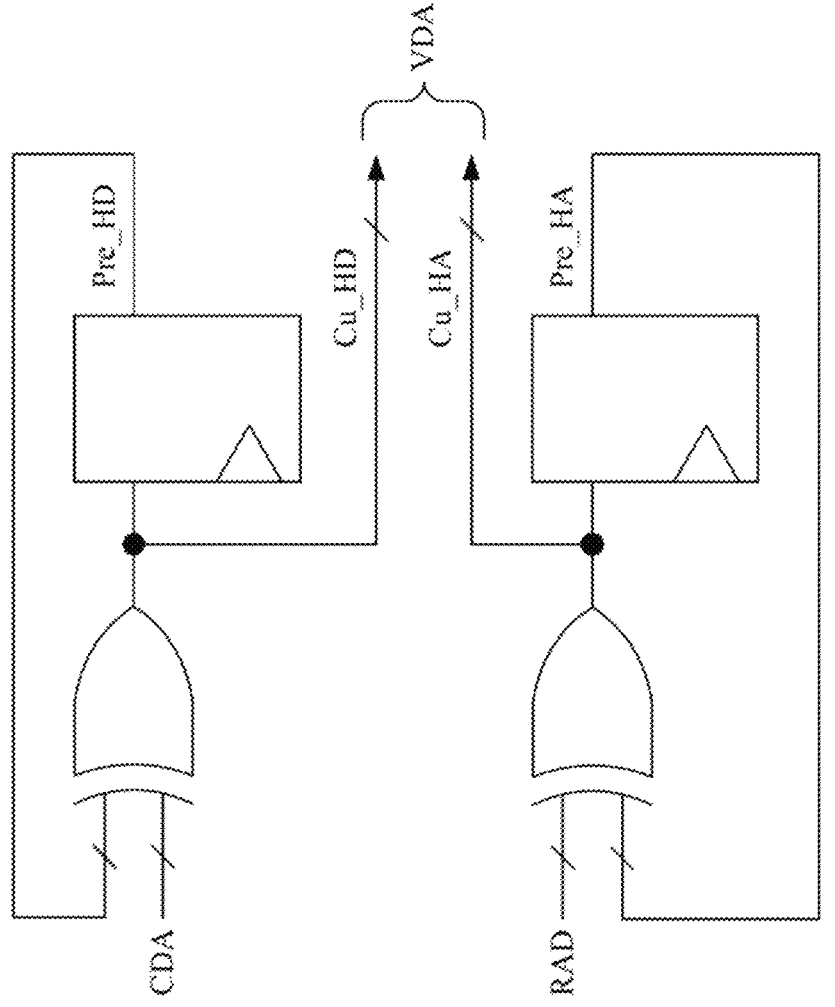
FIG. 5 is a simplified functional block diagram of a parity checker according to one embodiment of the present disclosure.

Refer to FIG. 5 together, wherein FIG. 5 is a simplified functional block diagram of a parity checker 115 according to one embodiment of the present disclosure. In step S340, the master device 110 utilizes the verification data VDA to verify whether the write operation has been performed correctly or not. Since the control data CDA and the address RAD are both transmitted from the master device 110 to the slave device 120, the control data CDA and the address RAD are known to the master device 110.

More specifically, step S340 comprises steps S342-S346. In step S342, the parity checker 115 is configured to utilize the control data CDA and a previous data parity value Pre_HD on the master device to perform the aforementioned first parity operation (e.g., an XOR operation), so as to generate a current data parity value Cu_HD on the master device. The parity checker 115 is further configured to utilize the current data parity value Cu_HD on the master device to update the previous data parity value Pre_HD on the master device. That is, the parity checker 115 will use the current data parity value Cu_HD on the master device as the previous data parity value Pre_HD on the master device in the next first parity operation.

In step S344, the parity checker 115 is configured to utilize the address RAD and a previous address parity value Pre_HA on the master device to perform the aforementioned second parity operation (e.g., an XOR operation), so as to generate a current address parity value Cu_HA on the master device. The parity checker 115 is further configured to use the current address parity value Cu_HA on the master device to update the previous address parity value Pre_HA on the master device. That is, the parity checker 115 will use the current address parity value Cu_HA on the master device as the previous address parity value Pre_HA on the master device in the next second parity operation.

In step S346, the processor 111 is configured to compare the current data parity value Cu_DD on the slave device with the current data parity value Cu_HD on the master device in the verification data VDA. The processor 111 is further configured to compare the current address parity value Cu_DA on the slave device with the current address parity value Cu_HA on the master device in the verification data VDA. If the processor 111 determines that current data parity value Cu_DD on the slave device is the same as the current data parity value Cu_HD on the master device, and if the current address parity value Cu_DA on the slave device is the same as the current address parity value Cu_HA on the master device, then the processor 111 will determine that the slave device 120 has performed the write operation correctly.

On the other hand, if the processor 111 determines that the current data parity value Cu_DD on the slave device is different from the current data parity value Cu_HD on the master device, or the current address parity value Cu_DA on the slave device is different from the current address parity value Cu_HA on the master device, then the processor 111 will determine that the slave device 120 have not performed the write operation correctly. In this situation, the processor 111 may perform a predetermined operation, wherein the predetermined operation may be re-sending an instruction about the write operation such as "address instruction", "post-read-increment-address instruction" and/or write instruction WIS, but the present disclosure is not limited thereto. In some embodiments, whenever the write operation is determined to be not performed correctly, the processor 111 may perform ant suitable operation.

In some embodiments, the counter 117 of the master device 110 is configured to calculate an output counting of write instruction WIS. In step S346, the processor 111 may further compare whether the output counting of the write instruction WIS is the same as the execution counting of the operation in the verification data VDA. If so, then the processor 111 will determine that the slave device 120 has performed the write operation correctly. If not, then the processor 111 will determine that the slave device 120 fails to perform the write operation correctly.

In some embodiments, the parity checker 115 may be replaced with a software module with the same functionality. That is, the processor 111 may perform steps S342-S346 by executing the software module.

It is worth mentioning that the data transmission system 100 and the verification method 300 in the present disclosure may utilize any suitable communication protocol with a master-slave relationship to communicate, without being limited in communicating using the Clause 45 MDIO frame format. In some embodiments, if the data transmission system 100 utilizes the Clause 22 MDIO frame format to communicate, or uses the inter-integrated circuit bus to communicate, then the address register 127 of the slave device 120 may be omitted. With the address register 127 being omitted, in steps S320-S340, the processor 121 and the parity checker 125 of the slave device 120 may get the address RAD and the control data CDA from the write instruction WIS directly, so as to perform the write operation, the first parity operation and the second parity operation.

In other embodiments, the data transmission system 100 utilizes the serial peripheral interface to communicate. Since there is no address instruction in the serial peripheral interface, the address register 127 of the slave device 12 may be omitted, and in steps S334 and S344, the master device 110 and the slave device 120 may skip the second parity operation. In other words, the verification data VDA may not comprise the current address parity value Cu_DA on the slave device, and in step S346, the processor 111 of the master device 110 may not compare whether the current address parity value Cu_DA on the slave device is the same as the current address parity value Cu_HA on the master device.

To sum up, the data transmission system 100 and the verification method 300 whether there is an unexpected event occurred while writing the control data CDA, and thereby prevent the data transmission system 100 from unexpected operational errors.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A data transmission system, comprising:
a master device, configured to output a write instruction, wherein the write instruction comprises a control data; and
a slave device, comprising a data register, the slave device being coupled to the master device, wherein in response to that the slave device receives the write instruction, the slave device is configured to perform a write operation to store the control data at an address in the data register according to the write instruction,
wherein the slave device is configured to generate a verification data corresponding to the write operation according to the control data and the address,
wherein the master device is configured to utilize the verification data to verify the write operation,
wherein the slave device is configured to:

utilize the control data and a previous data parity value on the slave device to perform a first parity operation, so as to generate a current data parity value on the slave device; and
utilize the address and a previous address parity value on the slave device to perform a second parity operation, so as to generate a current address parity value on the slave device,
wherein the verification data comprises the current data parity value on the slave device and the current address parity value on the slave device, and the first parity operation is the same as or different from the second parity operation.

2. The data transmission system of claim 1, wherein the first parity operation and the second parity operation are XOR operations.

3. The data transmission system of claim 1, wherein the slave device is configured to calculate an execution counting of the write operation, wherein the verification data further comprises the execution counting.

4. The data transmission system of claim 1, wherein the master device is configured to:
utilizing the control data and a previous data parity value on the master device to perform the first parity operation, so as to generate a current data parity value on the master device; and
utilizing the address and a previous address parity value on the master device to perform the second parity operation, so as to generate a current address parity value on the master device,
wherein the master device is configured to compare the current data parity value on the slave device with the current data parity value on the master device, and compare the current address parity value on the slave device with the current address parity value on the master device, so as to verify the write operation.

5. The data transmission system of claim 4, wherein the slave device is configured to calculate an execution counting of the write operation, wherein the verification data further comprise the execution counting,
wherein the master device is configured to calculate an output counting of the write instruction, the master device is configured to compare the execution counting and the output counting, so as to verify the write operation.

6. The data transmission system of claim 1, wherein the slave device is configured to obtain the address from the write instruction.

7. The data transmission system of claim 1, wherein the slave device is configured to search for the address from an address register of the slave device according to the write instruction.

8. A verification method, comprising:
outputting a write instruction from a master device to a slave device, wherein the write instruction comprises a control data;
performing a write operation by the slave device, so as to store the control data at an address in a data register of the slave device according to the write instruction;
generating a verification data corresponding to the write operation by the slave device according to the control data and the address; and
utilizing the verification data to verify the write operation by the master device;
wherein generating the verification data according to the control data and the address comprises:

utilizing the control data and a previous data parity value on the slave device to perform a first parity operation by the slave device, so as to generate a current data parity value on the slave device; and utilizing the address and a previous address parity value on the slave device to perform a second parity operation by the slave device, so as to generate a current address parity value on the slave device, wherein the verification data comprises the current data parity value on the slave device and the current address parity value on the slave device, and the first parity operation is the same as or different from the second parity operation.

9. The verification method of claim 8, wherein the first parity operation and the second parity operation are XOR operations.

10. The verification method of claim 8, wherein generating the verification data according to the control data and the address further comprises:

calculating an execution counting of the write operation by the slave device, wherein the verification data further comprises the execution counting.

11. The verification method of claim 8, wherein utilizing the verification data to verify the write operation comprises:

utilizing the control data and a previous data parity value on the master device to perform the first parity operation by the master device, so as to generate a current data parity value on the master device;

utilizing the address and a previous address parity value on the master device to perform the second parity operation by the master device, so as to generate a current address parity value on the master device; and comparing the current data parity value on the slave device with the current data parity value on master device, and comparing the current address parity value on the slave device with the current address parity value on the master device by the master device, so as to verify the write operation.

12. The verification method of claim 11, wherein generating the verification data according to the control data and the address further comprises:

calculating an execution counting of the write operation by the slave device, wherein the verification data further comprises the execution counting, wherein utilizing the verification data to verify the write operation further comprises:

calculating an output counting of the write instruction by the master device; and comparing the execution counting with the output counting by the master device, so as to verify the write operation.

13. The verification method of claim 8, wherein the slave device is configured to obtain the address from the write instruction.

14. The verification method of claim 8, wherein the slave device is configured to search for the address from an address register of the slave device according to the write instruction.

15. A slave device, configured to receive a write instruction outputted by a master device, wherein the write instruction comprises a control data, the slave device comprises:

a data register;

a processor, configured to perform a write operation, so as to store the control data at an address in the data register according to the write instruction; and a parity checker, configured to utilize the control data and a previous data parity value on the slave device to perform a first parity operation, so as to generate a current data parity value on the slave device, and configured to utilize the address and a previous address parity value on the slave device to perform a second parity operation, so as to generate a current address parity value on the slave device, wherein the processor is configured to output the current data parity value on the slave device and the current address parity value on the slave device to the master device, wherein the first parity operation is the same as or different from the second parity operation.

16. The slave device of claim 15, wherein the first parity operation and the second parity operation are XOR operations.

17. The slave device of claim 15, further comprising:

a counter, configured to calculate an execution counting of the write operation, wherein the processor is configured to output the execution counting to the master device.

18. The slave device of claim 15, further comprising an address register, wherein the processor is configured to search for the address from the address register according to the write instruction.

* * * * *